(12) United States Patent
Bier et al.

(10) Patent No.: US 8,941,705 B2
(45) Date of Patent: Jan. 27, 2015

(54) APPARATUS FOR INSCRIPTION OF MARKING TAGS

(75) Inventors: Klaus-Dieter Bier, Leutenbach (DE); Juergen Schmid, Baltmannsweiler (DE); Heiko Daub, Kleingartach (DE); Ivan Dubovik, Ludwigsburg (DE)

(73) Assignee: Murrplastik Systemtechnik GmbH, Oppenweiler (DE)

( * ) Notice: Subject to any disclaimer, the term of this patent is extended or adjusted under 35 U.S.C. 154(b) by 0 days.

(21) Appl. No.: 13/988,082

(22) PCT Filed: Oct. 26, 2011

(86) PCT No.: PCT/EP2011/068710
§ 371 (c)(1),
(2), (4) Date: Jul. 29, 2013

(87) PCT Pub. No.: WO2012/065816
PCT Pub. Date: May 24, 2012

(65) Prior Publication Data
US 2013/0314488 A1  Nov. 28, 2013

(30) Foreign Application Priority Data

Nov. 18, 2010  (DE) .......................... 10 2010 051 539

(51) Int. Cl.
*B41J 2/435*  (2006.01)
*B41J 2/44*  (2006.01)
(Continued)

(52) U.S. Cl.
CPC ............. *B41J 2/442* (2013.01); *B23K 26/0096* (2013.01); *B41J 3/407* (2013.01); *B41J 11/06* (2013.01)
USPC .......................................................... 347/224

(58) Field of Classification Search
USPC ................................. 347/224, 225
See application file for complete search history.

(56) References Cited

U.S. PATENT DOCUMENTS 2,901,963 A * 9/1959 Richardson, Jr. ......... 126/299 D
(Continued)

FOREIGN PATENT DOCUMENTS

DE  31 08 404  11/1982
DE  37 25 217  2/1989
(Continued)

OTHER PUBLICATIONS

International Search Report of PCT/EP2011/068710, date of mailing Dec. 29, 2011.
(Continued)

*Primary Examiner* — Hai C Pham
(74) *Attorney, Agent, or Firm* — Collard & Roe, P.C.

(57) ABSTRACT

The invention relates to a device (10) for the inscription of marking tags, comprising a supporting surface (30) for the marking tags, comprising a laser inscription device and comprising a housing (12) for enclosing a laser beam that emerges from the laser inscription device and is directed onto the supporting surface (30), wherein the housing (12) has a lower housing part (14) and a covering hood (16), arranged on or over the lower housing part (14). According to the invention, it is provided that the supporting surface (30) is arranged on a turntable (24), which can rotate about an axis of rotation (26) that is fixed in relation to the housing, is arranged between the lower housing part (14) and the covering hood (16) protrudes laterally beyond the covering hood (16) and can be moved between an inscription position, in which the supporting surface (30) is completely covered by the covering hood (16), and a loading position, in which the supporting surface (30) is completely outside the covering hood (16), and that the turntable (24) has two sealing ribs (36, 38), which extend radially from the axis of rotation (26), protrude from the supporting surface (30) and in the inscription position lie against a front wall (42) of the covering hood (16).

10 Claims, 4 Drawing Sheets

(51) Int. Cl.
*B23K 26/00* (2014.01)
*B41J 3/407* (2006.01)
*B41J 11/06* (2006.01)

(56) References Cited

U.S. PATENT DOCUMENTS

| | | | | |
|---|---|---|---|---|
| 4,205,216 | A | * | 5/1980 | Douglas ..................... 219/121.6 |
| 5,518,325 | A | | 5/1996 | Kahle |
| 7,845,100 | B2 | | 12/2010 | Bier et al. |
| 8,354,611 | B2 | * | 1/2013 | Govorkov et al. ....... 219/121.69 |
| 2007/0264073 | A1 | | 11/2007 | Hanada et al. |

FOREIGN PATENT DOCUMENTS

| | | | |
|---|---|---|---|
| DE | 200 21 910 | 11/2001 | |
| DE | 10 2005 058 387 | 6/2007 | |
| EP | 1 589 278 | 10/2005 | |
| JP | 2007175725 A * | 7/2007 | ............. B23K 26/16 |

OTHER PUBLICATIONS

International Preliminary Report on Patentability of PCT/EP2011/068710, date of mailing Jun. 13, 2013.

\* cited by examiner

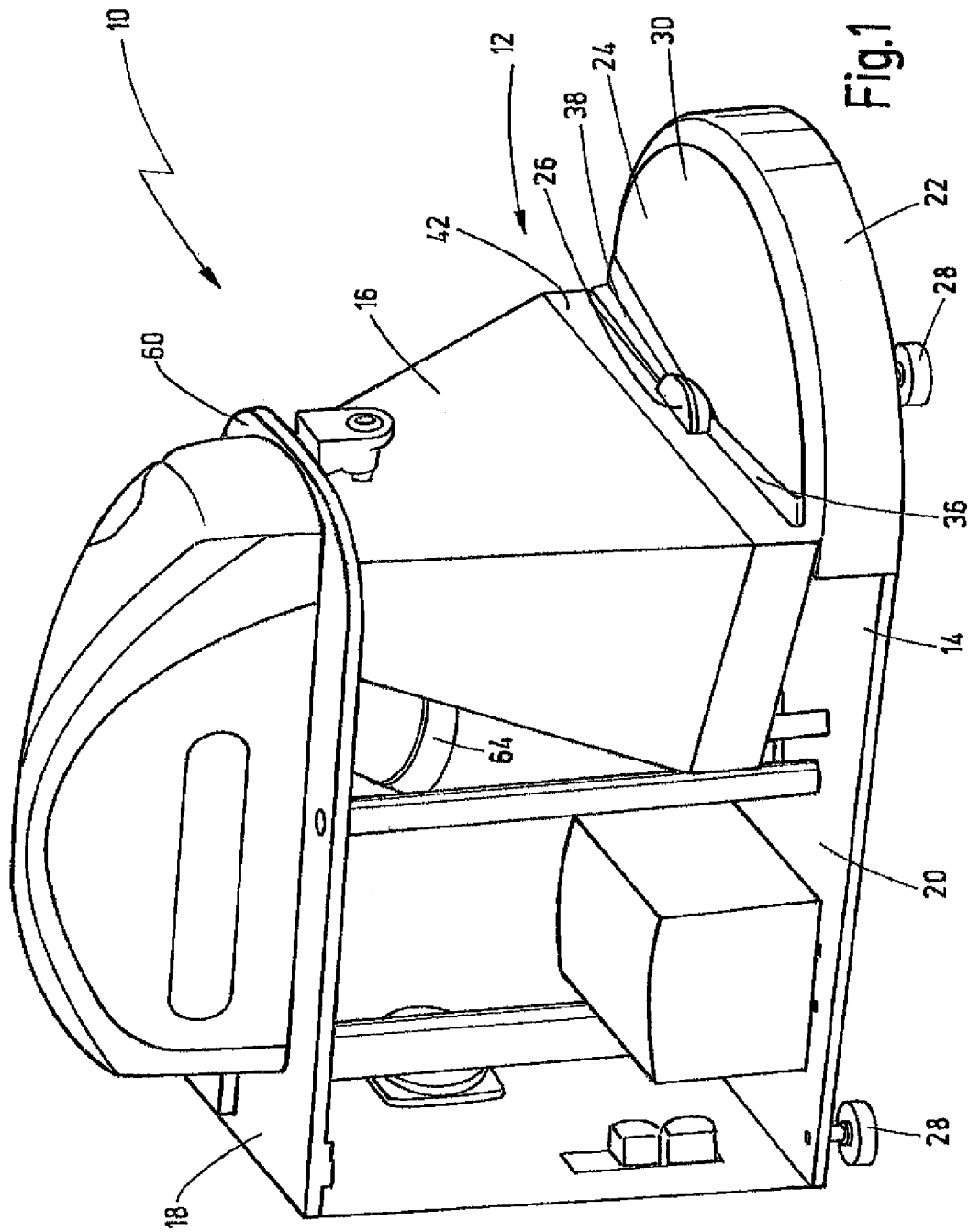

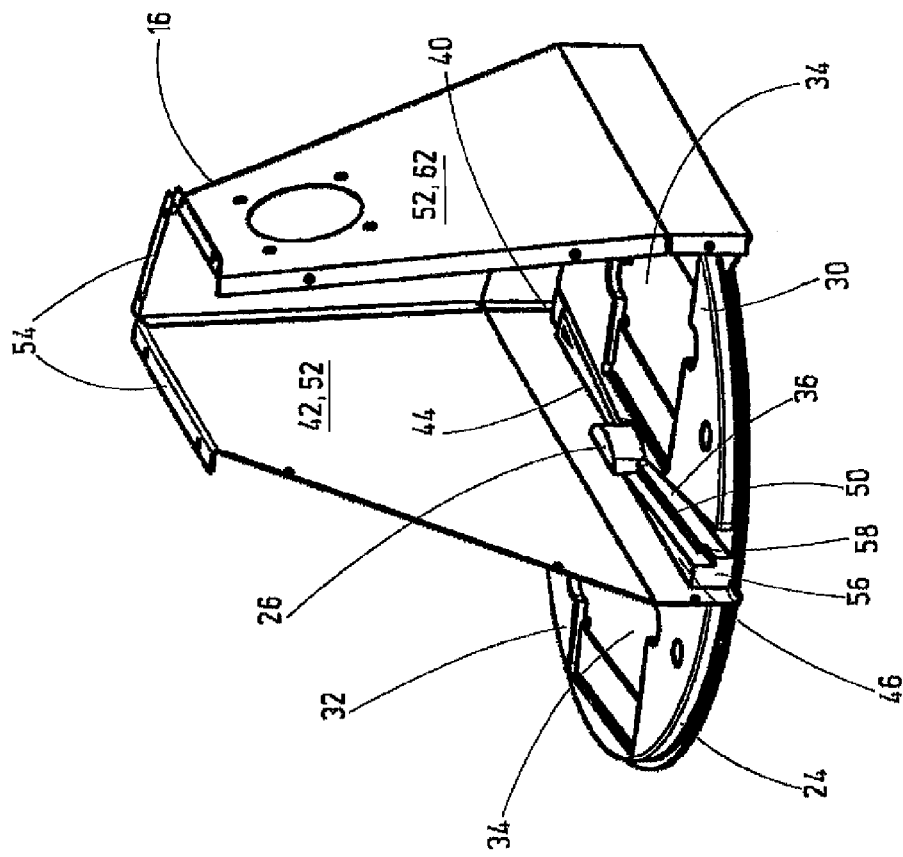
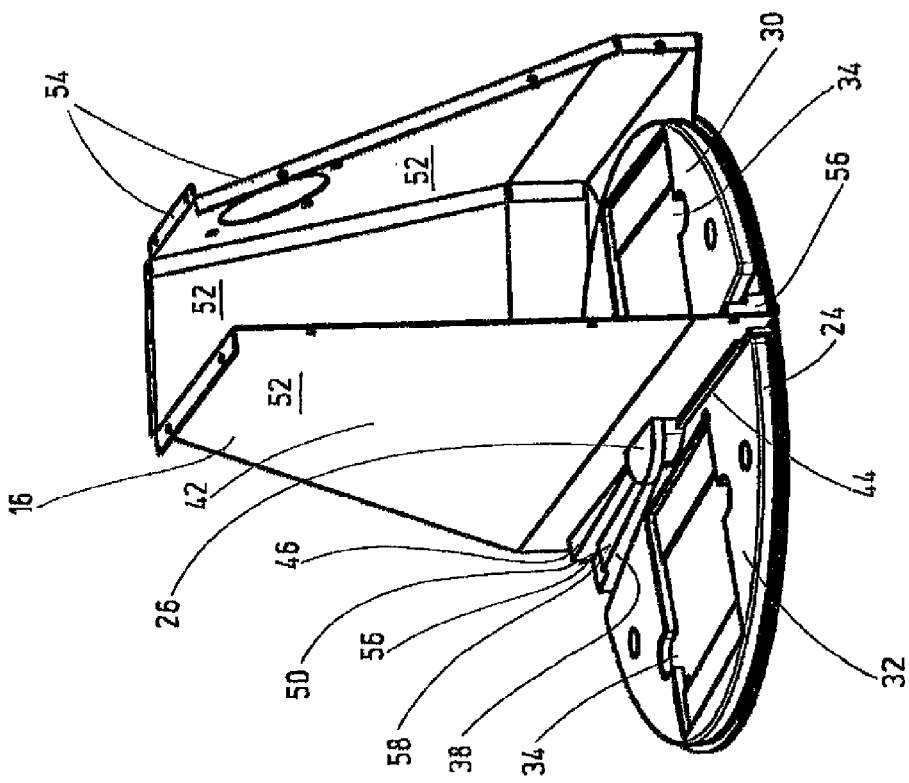

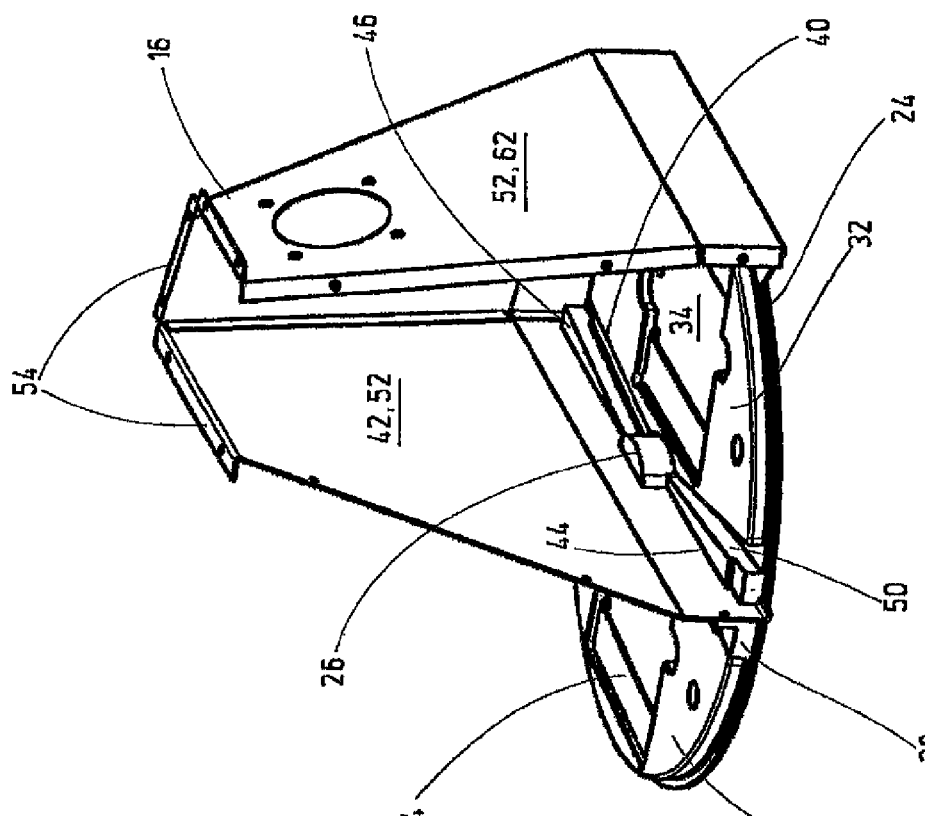
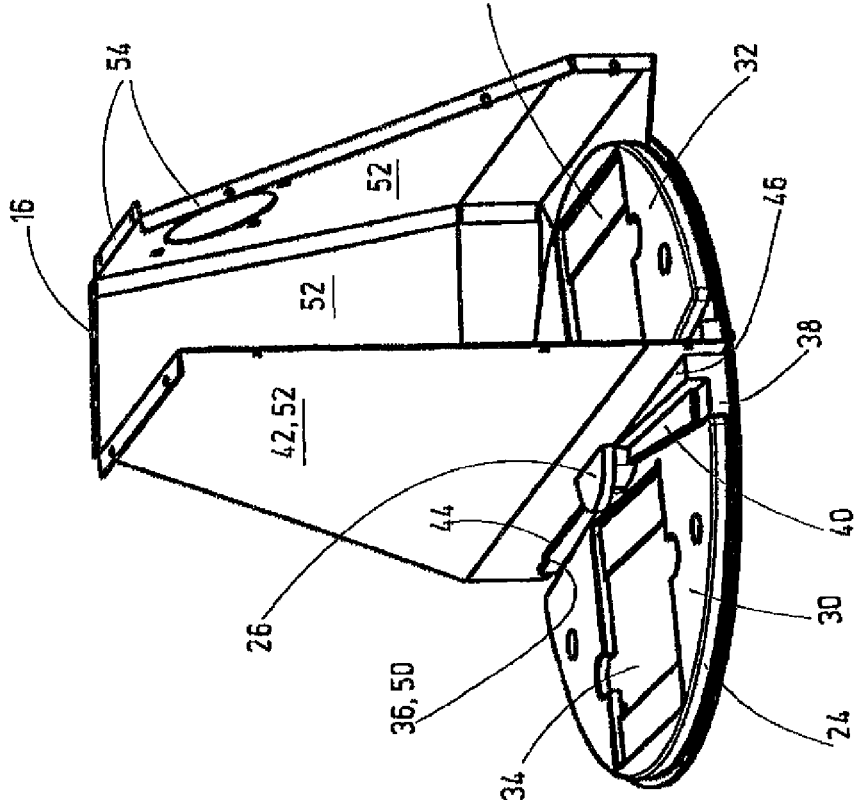

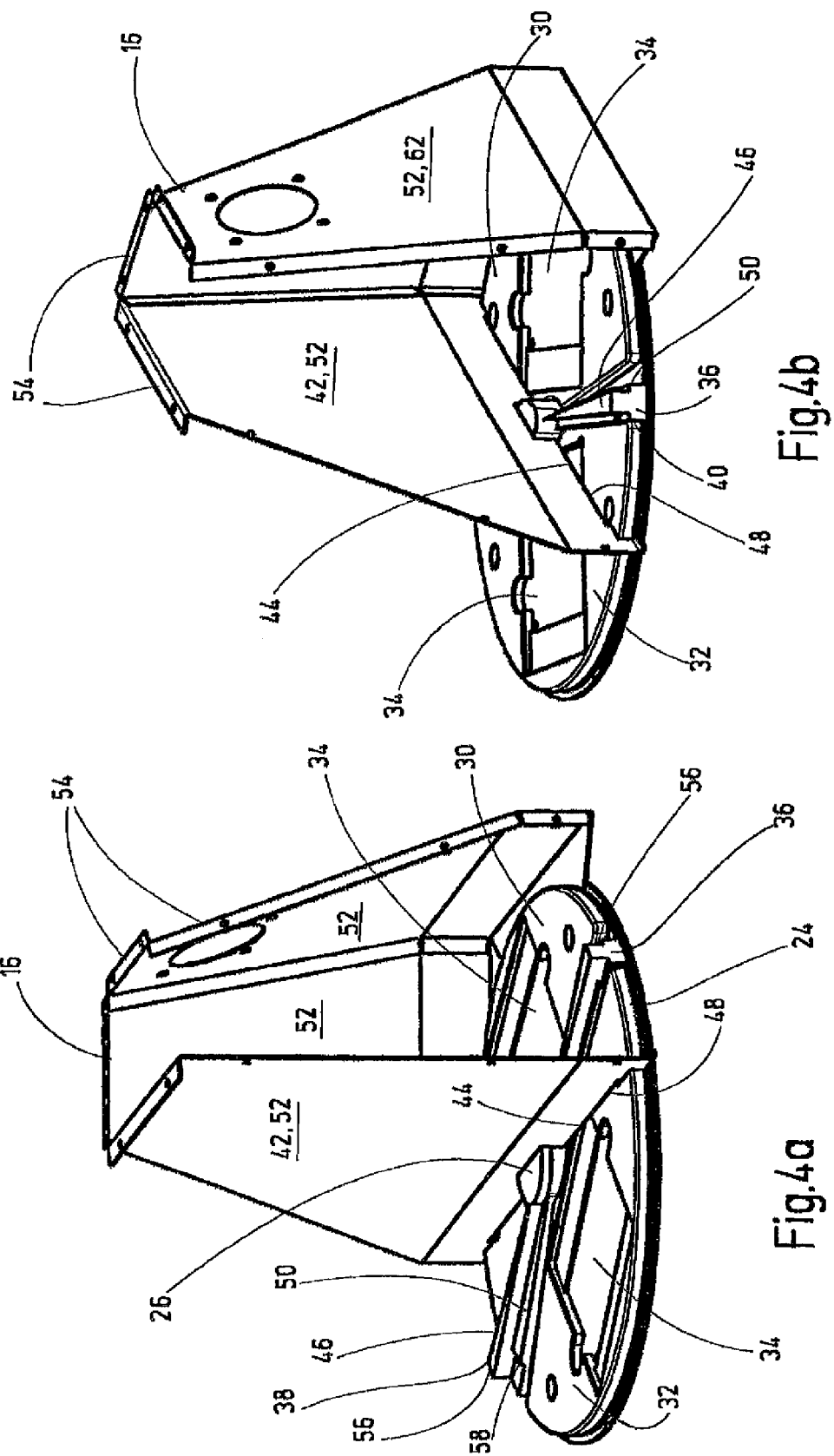

APPARATUS FOR INSCRIPTION OF MARKING TAGS

CROSS REFERENCE TO RELATED APPLICATIONS

This application is the National Stage of PCT/EP2011/068710 filed on Oct. 26, 2011, which claims priority under 35 U.S.C. §119 of German Application No. 10 2010 051 539.6 filed on Nov. 18, 2010, the disclosure of which is incorporated by reference. The international application under PCT article 21(2) was not published in English.

The invention relates to an apparatus for inscription of marking tags.

Laser inscription apparatuses of the type mentioned initially serve for inscription of marking tags such as those that are used for marking of electrical lines, for example. The marking tags are generally laid onto the supporting surface as a one-piece, cohesive set of marking tags, so that they are positioned in defined manner with reference to the laser inscription device. The laser inscription device then applies the marking to the marking tags. In this connection, however, strict protective regulations must be followed. If there is a risk that laser light exits out of the housing, the user must generally wear protective goggles, on the basis of worker protection laws. An attempt was therefore made to configure the covering hood accordingly, so that no laser light can exit. However, these measures lead to a complicated structure of the inscription apparatus, because the covering hood has to be removed after every inscription procedure, to remove the set of inscribed marking tags, and to be able to put a set of non-inscribed marking tags in place.

It is therefore the task of the invention to further develop an apparatus of the type mentioned initially, in such a manner that it is easier to handle.

This task is accomplished, according to the invention, by means of an apparatus as described herein. Advantageous further developments of the invention are also described herein.

The invention is based on the idea that with the turntable, an easy to handle possibility is made available for placing the marking tags onto the supporting surface outside of the housing, and transporting them into the housing with a simple hand movement, by turning the turntable. Sealing of the gap between the lower housing part and the covering hood then takes place by means of the sealing ribs, so that exiting of laser light from the housing is made more difficult or actually prevented. This measure allows operating the inscription apparatus in a lower laser protection class, so that a user might not have to wear protective goggles.

It is practical if the sealing ribs each have a first section for engaging under a lower edge of the front wall of the covering hood, and a second section for lying against the front wall. By means of this measure, the gap is sealed twice: for one thing by the first section, which preferably has a horizontal surface, which lies against the lower edge of the front wall in the inscription position, and therefore is already suitable for preventing exiting of laser light by itself. For another, in addition, by the second section, which lies against the front wall in the inscription position and prevents exiting of laser light, at least in part, even if a small gap remains between the first section and the lower edge of the front wall. According to the preferred exemplary embodiment, a first one of the sealing ribs lies against the inside of the front wall that faces the laser beam, while the second of the sealing ribs, with its second section, lies against the outside of the front wall that faces away from the laser beam. When the turntable is turned into the inscription position, the first sealing rib is therefore laid against the front wall from the inside, and the second sealing rib is laid against it from the outside.

According to the preferred embodiment, the sealing ribs lie against the front wall in the loading position, as well, and the turntable has a further supporting surface for the marking tags, whereby the sealing ribs are disposed between the two supporting surfaces. In this connection, it is practical if the first sealing rib lies against the inside of the front wall even in the loading position, while the second sealing rib once again lies against the outside of the front wall. It is practical if the sealing ribs, in each instance, have a further section for engaging under the lower edge of the front wall in the loading position, so that the sealing ribs lie against the front wall, in the loading position, in the same manner as in the inscription position. By means of these measures, it is possible to replace a set of inscribed marking tags that lies on the further supporting surface with a set of non-inscribed marking tags, while a set of marking tags lying on the supporting surface is being inscribed in the housing. The inscription position of the turntable is therefore defined in that the supporting surface is situated in the housing, while the further supporting surface is situated outside the housing. Vice versa, of course, it is also possible to replace a set of marking tags lying on the supporting surface and already inscribed with a non-inscribed set, while a set of marking tags that lies on the further supporting surface is just being inscribed.

It is practical if the sections that are intended for engaging under the lower edge of the front wall have a step, in each instance, so that their height is reduced toward the free end of the sealing ribs. This is particularly advantageous if the covering hood is composed of multiple metal sheets that have a bent side strip, in each instance, at least in part, on at least one of their side edges, which strip lies against the adjacent metal sheet with its full area. By means of the step on the free end of the sealing ribs, it is possible to guide a side strip that forms a connection between the front wall and the side wall adjacent to it down all the way to just above the supporting surface.

It is practical if the second sections of the sealing ribs widen continuously, proceeding from the axis of rotation, toward the free ends of the sealing ribs. In this way, the fact is taken into account that the front wall of the housing has a finite thickness, so that the second sections cannot be disposed at an angle of 180° relative to one another, if they are supposed to lie against the front wall in the inscription position. The supporting surface or the supporting surfaces is/are preferably provided with a depression, the contour of which corresponds to the contour of a set of marking tags. In this way, defined positioning of the set of marking tags on the supporting surface or on the further supporting surface is possible, so that the set of marking tags can be brought into a defined position relative to the laser inscription device, in simple manner. Typical shapes of the sets of marking tags are known from DE 10 2005 058 387 A1 and DE 37 25 217 02.

In the following, the invention will be explained in greater detail using an exemplary embodiment shown schematically in the drawing. This shows:

FIG. 1 an inscription apparatus in a perspective view, with the turntable in the loading position;

FIG. 2a, 2b partial views of the inscription apparatus according to FIG. 1 with the turntable in the inscription position;

FIG. 3a, 3b partial views of the inscription apparatus according to FIG. 1 with the turntable in the loading position; and FIG. 4a, 4b partial views of the inscription apparatus according to FIG. 1 with the turntable in a position between the inscription position and the loading position.

The inscription apparatus 10 for marking tags shown in FIG. 1 has a housing 12 that has a lower housing part 14, a covering hood 16, and a superstructure 18. The lower housing part 14 has a bottom plate 20 and a bearing 22, in which a turntable 24 is mounted to rotate about an axis of rotation 26. The bottom plate 20 and the bearing 22 rest on feet 28 that allow setting the apparatus up on a flat surface, for example a tabletop. The superstructure 18 that rests on the lower housing part 14 accommodates a laser inscription device, not shown in greater detail in the drawing, the laser beam of which is directed downward onto the turntable 24. The laser beam is enclosed all around by means of the covering hood 16, which is disposed between the superstructure 18 and the bearing 22 and connected with these. Toward the bottom, the laser beam is enclosed by the turntable 24, the bearing 22, and by edged sheet-metal parts of the covering hood 16.

Two supporting surfaces 30, 32 are disposed on the turntable 24, each having a depression 34 for accommodation of a set of marking tags. Two sealing ribs 36, 38 extend out from the axis of rotation 26, all the way to the outer edge of the turntable 24, which ribs project upward from the supporting surfaces 30, 32 and separate the first supporting surface 30 from the further supporting surface 32, in such a manner that the two supporting surfaces 30, 32 are equal in size. Each of the sealing ribs has three sections. A first section 40 has a horizontal surface that is disposed under a front wall 42 of the covering hood 16 and lies against the lower edge 44 of the front wall 42 when the first supporting surface 30 is completely covered by the covering hood 16. This position of the turntable 24 (FIG. 2a, 2b) is referred to as the inscription position, while the position of the turntable 24 shown in FIG. 1 and FIG. 3a, 3b, in which the first supporting surface 30 is situated completely outside the covering hood 16 is referred to as the loading position, because the depression 34 in the first supporting surface 30 can be loaded with a set of marking tags.

A second section 46 of the sealing ribs 36, 38 extends from the first section 40 vertically upward. The second section 46 of the first sealing rib 36 lies against the inner surface of the front wall 42 in the inscription position, over its entire area, while the second section 46 of the second sealing rib 38 lies against the outside of the front wall 42 in the inscription position. The sealing ribs 36, 38 therefore seal a gap 48 between the supporting surfaces 30, 32 and the covering hood 16, in such a manner that no laser light can penetrate through it any longer.

By means of a rotation of the turntable 24 about the axis of rotation 26, by an angle of slightly less than 180°, the turntable 24 is brought into the loading position shown in FIG. 3a, 3b, in which the second section 46 of the first sealing rib 36 once again lies against the inside of the front wall 42, while the second section 46 of the second sealing rib 38 lies against the outside of the front wall 42. A further, third section 50 of the sealing ribs 36, 38 engages under the lower edge 44 of the front wall 42, which section is structured in accordance with the first section 40, and lies against the lower edge 44 of the front wall 42 with a surface in the loading position. Therefore it is possible to inscribe a set of marking tags that is accommodated in the depression 34 of the second supporting surface 32, in the loading position, and to achieve the same seal of the gap 48 during its inscription as in the inscription position. The time during which a set of marking tags lying on the first supporting surface 30 is being inscribed can therefore be utilized to replace a set of marking tags lying on the second supporting surface 32, and vice versa. Therefore, in the inscription position, the first sections 40 engage under the front wall 42, and in the loading position, the third sections 50 engage under the front wall 42.

The covering hood 16 is composed of multiple metal sheets 52, whereby the metal sheets 52 are provided, in part, at their edges, with bent side strips 54. The side strips 54 lie against the adjacent metal sheet 52, in each instance, with their full area, so that the risk that laser light will penetrate through a crack is minimized. In the region of the turntable 24, the side strips 54 end just above the support surfaces 30, 32. The first and the third section 40, 50 of the sealing ribs 36, 38 have a step 58 toward their free ends 56, in each instance, so that their height is reduced there. The side strips 54 can therefore be guided down to just above the support surfaces 30, 32 in the region of the turntable 24. The first sealing rib 36 is structured to be narrower than the second sealing rib 38, and both sealing ribs 36, 38 become wider from the axis of rotation 26 toward their free ends.

The covering hood 16 is closed off, toward the top, by a ceiling plate 60 of the superstructure 18, through which the laser beam passes or through which the laser inscription device projects. Furthermore, a connector 64 for drawing off gases and particles that occur during the inscription procedure is disposed on a rear wall 62 of the covering hood 16.

In summary, the following should be stated:

The invention relates to an apparatus 10 for inscription of marking tags, having a supporting surface 30 for the marking tags, having a laser inscription device, and having a housing 12 for enclosing a laser beam that exits from the laser inscription device, directed at the supporting surface 30, wherein the housing 12 has a lower housing part 14 and a covering hood 16 disposed on or above the lower housing part 14. According to the invention, it is provided that the supporting surface 30 is disposed on a turntable 24 that can rotate about an axis of rotation 26 fixed in place in the housing, which turntable is disposed between the lower housing part 14 and the covering hood 16, and projects laterally beyond the covering hood 16 and can be moved between an inscription position in which the supporting surface 30 is completely covered by the covering hood 16, and a loading position in which the supporting surface 30 is situated entirely outside of the covering hood 16, and that the turntable 24 has two sealing ribs 36, 38 that extend radially from the axis of rotation 26, projecting out of the supporting surface 30, which ribs lie against a front wall 42 of the covering hood 16 in the inscription position.

The invention claimed is:

1. An apparatus for inscription of marking tags, having a supporting surface for the marking tags, having a laser inscription device, and having a housing for enclosing a laser beam that exits from the laser inscription device, directed at the supporting surface, wherein the housing has a lower housing part and a covering hood disposed on or above the lower housing part, wherein the supporting surface is disposed on a turntable that can rotate about an axis of rotation fixed in place in the housing, which turntable is disposed between the lower housing part and the covering hood, and projects laterally beyond the covering hood, and can be moved between an inscription position in which the supporting surface is completely covered by the covering hood, and a loading position in which the supporting surface is situated entirely outside of the covering hood, wherein the turntable has two sealing ribs that extend radially from the axis of rotation, projecting out of the supporting surface, which ribs lie against a front wall of the covering hood in the inscription position, and wherein the sealing ribs each have a first section for engaging under a lower edge of the front wall and a second section that extends upward from the first section, for lying against the front wall.

2. The apparatus according to claim 1, wherein each of the first sections lies against the lower edge of the front wall in the inscription position.

3. The apparatus according to claim 1, wherein in the inscription position, a first one of the sealing ribs lies against the inside of the front wall that faces the laser beam, while the second of the sealing ribs lies against the outside of the front wall that faces away from the laser beam.

4. The apparatus according to claim 3, wherein in the loading position, the first sealing rib lies against the inside of the front wall and the second sealing rib lies against the outside of the front wall.

5. The apparatus according to claim 1, wherein the sealing ribs lie against the front wall in the loading position, as well, and wherein the turntable has a further supporting surface for the marking tags, wherein the sealing ribs are disposed between the two supporting surfaces.

6. The apparatus according to claim 5, wherein the sealing ribs each have a further section for engaging under the lower edge of the front wall in the loading position.

7. The apparatus according to claim 6, wherein the sections for engaging under the lower edge of the front wall each have a step, so that their height is reduced toward the free end of the sealing ribs.

8. The apparatus according to claim 1, wherein the covering hood is composed of multiple metal sheets that have a bent side strip, in part, in each instance, at least on one of their side edges, which strip lies against the adjacent metal sheet with its full area.

9. The apparatus according to claim 1, wherein the second sections widen continuously, proceeding from the axis of rotation to the free ends of the sealing ribs.

10. The apparatus according to claim 1, wherein the supporting surface or the supporting surfaces is/are provided with a depression, the contour of which corresponds to the contour of the set of marking tags.

\* \* \* \* \*